United States Patent
Lin et al.

(10) Patent No.: US 11,704,833 B2
(45) Date of Patent: *Jul. 18, 2023

(54) MONOCULAR VISION TRACKING METHOD, APPARATUS AND NON-TRANSITORY COMPUTER-READABLE STORAGE MEDIUM

(71) Applicant: Baidu Online Network Technology (Beijing) Co., Ltd, Beijing (CN)

(72) Inventors: Yuan Lin, Beijing (CN); Yongjie Zhang, Beijing (CN); Yingchao Li, Beijing (CN); Zhongqin Wu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 104 days.

This patent is subject to a terminal disclaimer.

(21) Appl. No.: 17/231,796

(22) Filed: Apr. 15, 2021

(65) Prior Publication Data
US 2021/0233275 A1 Jul. 29, 2021

Related U.S. Application Data

(63) Continuation of application No. 16/265,350, filed on Feb. 1, 2019, now Pat. No. 10,984,554.

(30) Foreign Application Priority Data

May 30, 2018 (CN) .......................... 201810539448.9

(51) Int. Cl.
*G06T 7/80* (2017.01)
*G06T 7/70* (2017.01)
(52) U.S. Cl.
CPC .................. *G06T 7/80* (2017.01); *G06T 7/70* (2017.01); *G06T 2207/30244* (2013.01)

(58) Field of Classification Search
CPC ...... G06K 9/00671; G06T 2207/30244; G06T 7/70; G06T 7/80; H01R 12/57; H01R 12/724
See application file for complete search history.

(56) References Cited

U.S. PATENT DOCUMENTS 9,406,145 B2 8/2016 Gammenthaler et al.
10,096,161 B2 * 10/2018 Callaghan .......... G06Q 30/0643
(Continued)

FOREIGN PATENT DOCUMENTS

CN 105067011 A 11/2015
CN 105678785 A 6/2016
(Continued)

OTHER PUBLICATIONS

State Intellectual Property Office of the People's Republic of China, "Search Report," and English Translation thereof, issued in Chinese Application No. 201810539448.9, dated May 17, 2019, 6 pages.
(Continued)

*Primary Examiner* — Bobbak Safaipour
(74) *Attorney, Agent, or Firm* — Akerman LLP

(57) ABSTRACT

A monocular vision tracking method, apparatus, and a non-volatile computer-readable storage medium are provided. The method includes: acquiring a first camera pose by using a wireless tracker; capturing calibration board images by using a camera, and selecting a set of images from the captured calibration board images according to image sharpness and camera pose difference; calculating a second camera pose in the camera calibration algorithm according to the selected set of images; obtaining a conversion parameter between the first camera pose and the second camera pose; and converting a first capturing pose into a second capturing pose by means of the conversion parameter when a scenario is captured, wherein the first capturing pose is acquired by the wireless tracker and the second capturing pose corresponds to a pose of the camera.

20 Claims, 5 Drawing Sheets

(56) References Cited

U.S. PATENT DOCUMENTS

2017/0367766 A1* 12/2017 Mahfouz ............... A61F 2/3859
2018/0075620 A1*  3/2018 Wang ........................ G06T 7/70
2019/0370989 A1* 12/2019 Zhao ........................ G06T 17/00

FOREIGN PATENT DOCUMENTS

| CN | 105809706 A | 7/2016 |
| CN | 107452036 A | 12/2017 |
| CN | 107509245 A | 12/2017 |

OTHER PUBLICATIONS

State Intellectual Property Office of the People's Republic of China, "First Office Action," and English translation thereof, issued in Chinese Application No. 201810539448.9, dated May 22, 2019, 16 pages.

Zhiyan et al., Design and Implementation of a Vision-based Augmented Reality System (School of Mechanical Science and Engineering, Huazhong University of Science and Technology, Wuhan 430074, China); China Academic Journal Electronic Publishing House; Jun. 30, 2007; pp. 55-57.

Chang'An, "Study on Position and Attitude Tracking Technology of Single Camera Vision Based on Cooperate Aim," Dissertation for the Master Degree in Engineering, Harbin Institute of Technology, Feb. 15, 2012, 58 pages.

\* cited by examiner

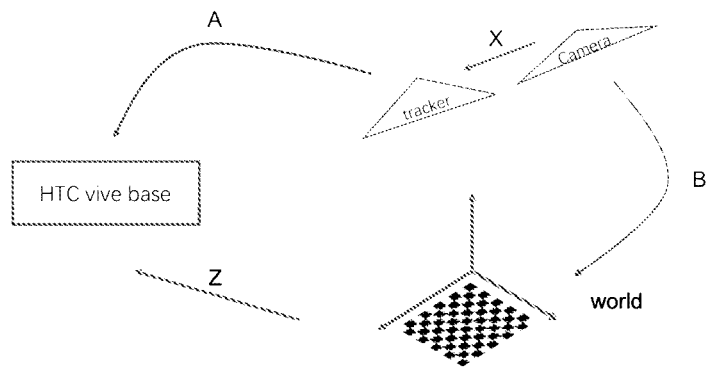

Figure 3

| acquiring corresponding data of the first camera pose and of the second camera pose according to a set time difference between system time of the camera and system time of the wireless tracker, and obtaining an optimal conversion matrix and an optimal re-projection error in the case of the time difference by using a hand-eye calibration for registration | S210 |

↓

| adjusting the time difference, and determining the time difference corresponding to the optimal re-projection error with the smallest value, as the system time difference | S220 |

↓

| determining the optimal conversion matrix in the case of the system time difference, as the conversion parameter between the first camera pose and the second camera pose | S230 |

Figure 4

| obtaining an initial value of the conversion matrix based on the singular value decomposition method according to the corresponding data of the first camera pose and of the second camera pose, and a formula of a conversion relationship between the first camera pose and the second camera pose | S310 |

↓

| obtaining an optimal conversion matrix at a current time difference by optimizing the re-projection error using the Gauss-Newton method, according to the re-projection error formula and the formula of the conversion relationship between the first camera pose and the second camera pose | S320 |

Figure 5

MONOCULAR VISION TRACKING METHOD, APPARATUS AND NON-TRANSITORY COMPUTER-READABLE STORAGE MEDIUM

CROSS-REFERENCE TO RELATED APPLICATIONS

The present application is a continuation of U.S. patent application Ser. No. 16/265,350, filed on Feb. 1, 2019, which claims the benefit of priority to Chinese Patent Application No. 201810539448.9, filed before the State Intellectual Property Office on May 30, 2018, and entitled "Monocular Vision Tracking Method, Apparatus and Computer-readable Storage Medium". All of the aforementioned patent applications are incorporated in the present application by reference in their entireties.

TECHNICAL FIELD

The present application relates to the field of information technology, and in particular, to a monocular vision tracking method, apparatus and a non-volatile computer-readable storage medium.

BACKGROUND

Monocular vision tracking is an underlying core technology of computer vision applications, such as three-dimensional object reconstruction, Augmented Reality (AR) camera tracking and the like. Objective evaluation of the tracking accuracy of monocular vision tracking is a core indicator to measure the pros or cons of an algorithm. At present, vision tracking technology, such as Simultaneous Localization and Mapping (SLAM) or Visual Odometry (VO), are almost measured by using an absolute translation error (ATE) and a relative pose error (RPE). At present, the method for building monocular camera tracking database may include: introducing a 3D laser tracker, an inertial measurement unit (IMU), a stereo camera, or a Vicon for determination of a camera true pose. Generally, the camera true pose is obtained by using the Iterative Closest Point (ICP) Algorithm based on a three dimensional (3D) laser, a structure from motion (SFM) of a stereo camera, or a tracking sensor of a Vicon. Among them, the 3D laser tracker and the Vicon are expensive and not suitable for pre-research work in ordinary laboratories; the IMU and the stereo camera also require higher cost when achieving high performance requirements. Some commonly used public datasets are used in concentrated scenarios, such as in-vehicle scenarios for capturing data, or a few of single indoor scenarios. Techniques for large-scale multi-scenario applications, such as AR camera tracking, use these data for testing, resulting in a poor simulation of a user usage scenario.

The disadvantages of the existing technology mainly refer to the following aspects:

1) The devices used are costly and are not suitable for ordinary pre-research or preliminary evaluation;

2) The acquisition device used is time-synchronized based on hardware, which is difficult to implement for general developers;

3) It is assumed that the camera imaging model is unchanged, however in reality, on a mobile platform, the camera focal length cannot be fixed due to an anti-shake module of a mobile phone hardware, thereby reducing the estimation accuracy of a camera pose true value.

SUMMARY

A monocular vision tracking method, apparatus and a non-volatile computer-readable storage medium are provided according to embodiments of the present application.

In a first aspect, a monocular vision tracking method is provided in accordance with an embodiment of the present application, the method includes: acquiring a first camera pose by using a wireless tracker; capturing calibration board images by using a camera, and selecting a set of images from the captured calibration board images according to image sharpness and camera pose difference; calculating a second camera pose in the camera calibration algorithm according to the selected set of images; obtaining a conversion parameter between the first camera pose and the second camera pose; converting a first capturing pose into a second capturing pose by means of the conversion parameter when a scenario is captured, wherein the first capturing pose is acquired by the wireless tracker, and the second capturing pose corresponds to a pose of the camera, wherein a relative position between the wireless tracker and the camera remains unchanged, in processes of acquiring the first camera pose, capturing the calibration board images and capturing the scenario.

In a second aspect, a monocular vision tracking device is provided in accordance with an embodiment of the present application, the device includes: a first pose acquisition unit configured to acquire a first camera pose by using a wireless tracker; a second pose acquisition unit configured to capture calibration board images by using a camera, select a set of images from the captured calibration board images according to image sharpness and camera pose difference, and calculate a second camera pose in the camera calibration algorithm according to the selected set of images; a conversion parameter obtaining unit configured to obtain a conversion parameter between the first camera pose and the second camera pose; a conversion unit configured to convert a first capturing pose into a second capturing pose by means of the conversion parameter when a scenario is captured, wherein the first capturing pose is acquired by the wireless tracker, and the second capturing pose corresponds to a pose of the camera; wherein a relative position between the wireless tracker and the camera remains unchanged, in processes of acquiring the first camera pose, capturing the calibration board images and capturing the scenario.

In a third aspect, a monocular vision tracking apparatus is provided in accordance with an embodiment of the present application, the apparatus includes: one or more processors; and a storage device configured for storing one or more programs, wherein the one or more programs enable the one or more processors to implement any one of the methods described above according to the first aspect when executed by them.

In a possible design, the monocular vision tracking apparatus includes a processor and a memory, the memory is configured to store programs which support the monocular vision tracking apparatus in performing the monocular vision tracking methods described above in the first aspect, and the processor is configured to execute the programs stored in the memory. The monocular vision tracking apparatus can further includes communication interfaces configured for enabling the monocular vision tracking apparatus to communicate with another apparatus or communication network.

In a fourth aspect, a non-transitory computer-readable storage medium is provided according to an embodiment of the present application, in which computer programs are stored, wherein a process executes the computer programs to implement any one of the methods in the first aspect described above.

The above summary is for the purpose of the specification only and is not intended to be limiting in any way. In addition to the illustrative aspects, implementations and characteristics described above, further aspects, implementations and characteristics of the present application will be readily understood by reference to the drawings and the following detailed description.

BRIEF DESCRIPTION OF THE DRAWINGS

In the drawings, unless otherwise specified, identical reference numerals are used throughout the drawings to refer to identical or similar parts or elements. The drawings are not necessarily drawn to scale. It should be understood that these drawings merely illustrate some embodiments disclosed in accordance with the present application and are not to be considered as limiting the scope of the present application.

FIG. 3 is a schematic diagram of a hand-eye calibration solution of a monocular vision tracking method according to the present application;

FIG. 4 is flowchart of a monocular vision tracking method according to another preferred embodiment of the present application;

FIG. 5 is a flowchart of a monocular vision tracking method according to yet another preferred embodiment provided by the present application;

DETAILED DESCRIPTION OF THE EMBODIMENTS

In the following, only certain exemplary embodiments are briefly described. As can be recognized by those skilled in the art, the described embodiments may be modified in various different ways without departing from the spirit or scope of the present application. Accordingly, the accompanying drawings and description should be essentially considered as illustrative rather than restrictive.

Figure 1:
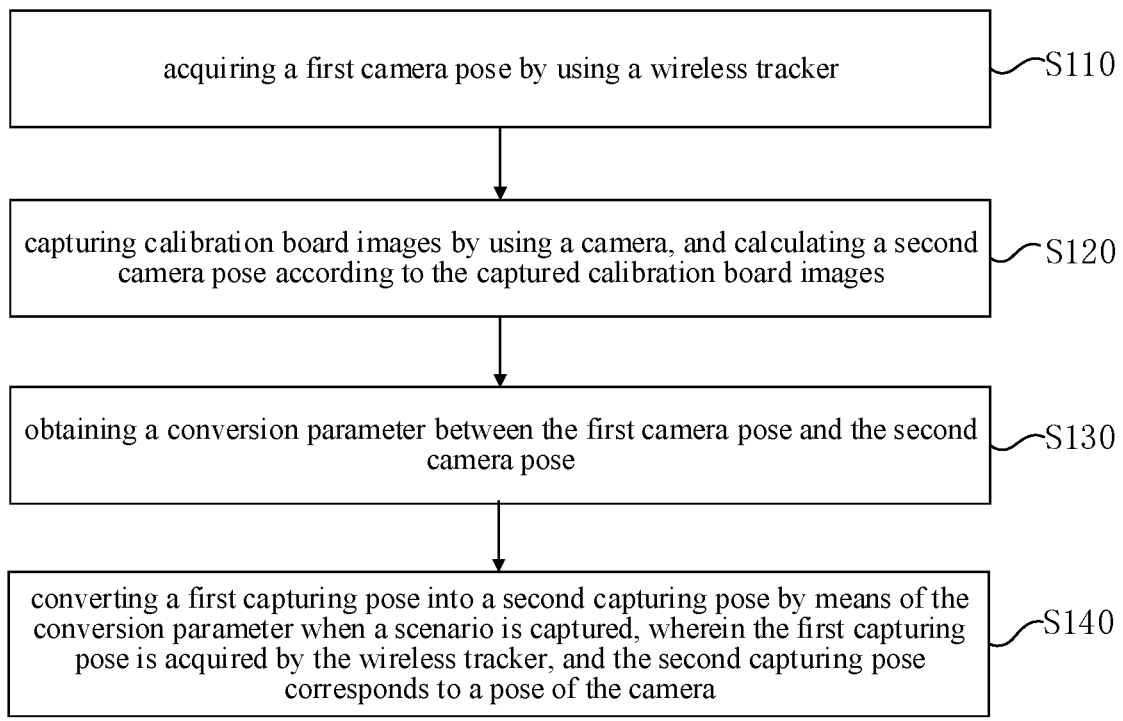
FIG. 1 is an overall frame diagram of a monocular vision tracking method according to an embodiment of the present application.

A monocular vision tracking method is provided according to an embodiment of the present application. FIG. 1 is an overall frame diagram of a monocular vision tracking method according to an embodiment of the present application. As shown in FIG. 1, a monocular vision tracking method according to an embodiment of the present application includes: in step S110, acquiring a first camera pose by using a wireless tracker; in step S120, capturing calibration board images by using a camera, and calculating a second camera pose according to the captured calibration board images; in step S130, obtaining a conversion parameter between the first camera pose and the second camera pose; in step S140, converting a first capturing pose into a second capturing pose by means of the conversion parameter when a scenario is captured, wherein the first capturing pose is acquired by the wireless tracker, and the second capturing pose corresponds to a pose of the camera; wherein a relative position between the wireless tracker and the camera remains unchanged, in processes of acquiring the first camera pose, capturing the calibration board images and capturing the scenario.

Regarding a method for constructing a monocular vision camera tracking database, in implementations of the exiting technology, a plurality of high-performance sensors which are costly are mostly combined together to obtain a camera pose. In order to enable a user to acquire a personalized database at a low cost, a method for constructing a monocular vision camera tracking database at low cost using a camera and a wireless tracker is provided according to an embodiment of the present application. Among them, the camera can adopt an ordinary mobile phone, and the wireless tracker can adopt a VR (Virtual Reality) head-mounted tracker, such as an HTC vive tracker. Data are acquired by using the HTC vive tracker, a first camera pose is output, and a second camera pose is calculated in a camera calibration algorithm based on a calibration board image captured by a mobile phone camera, and then a conversion parameter between the first camera pose and the second camera pose is obtained according to the first camera pose and the second camera pose. After the conversion parameter is obtained, it is then possible to perform a corresponding conversion of the pose of the vive tracker in terms of time and space when capturing an actual usage scenario, for example, typical interactive scenarios for an AR user such as a desktop or a ground and the like, thereby obtaining a camera pose during an image acquisition.

The above technical solutions have the following advantages or beneficial effects: by means of a camera and a wireless tracker, a monocular vision camera tracking database may be acquired and a true value of a pose of a camera may be constructed, devices used are no longer costly and are suitable for ordinary pre-research or preliminary evaluation, and a user usage scenario may be well simulated.

In an implementation of a monocular vision tracking method according to the present application, the calculating a second camera pose according to the captured calibration board images includes: performing a parameter normalization for the calibration board images captured by the camera to convert the calibration board images based on different imaging model parameters into calibration board images with same imaging model parameters; and calculating the second camera pose in the camera calibration algorithm, based on the calibration board images performed with the parameter normalization.

In a possible implementation, the entire technical solution is divided into two steps: step 1: normalization for camera parameters; step 2: registration for the pose of the camera and that of the HTC vive tracker in terms of time and space.

The parameter normalization refers to a conversion of the images acquired by the camera to the ones with same imaging model parameters in the case where model imaging parameters at different times are known. Specifically, a rear camera of a mobile phone can be used as a camera.

Imaging model parameters include camera internal parameters including a focal length of a camera, position information of a main point, and a distortion parameter. The focal length of a camera and the position information of a main point can be represented by a camera imaging matrix.

In this process, a mobile operating system that supports the real-time acquisition of camera parameters can be used. Under the premise of ignoring the distortion coefficient of a camera, it is assumed a target camera imaging matrix is $K_t$, the camera imaging matrix, when the image of the i-th frame is acquired by the camera, is $K_i$. The current image is $I_i(u,v)$, and the converted image corresponding to $K_t$ is $I_t(u,v)$, then the following formula is established:

$$I_t(u,v) = K_t K_i^{-1} I_i(u,v).$$

Since the focal length of the camera and the position information of the main point may be changed within a certain range during the images are acquired by the camera at different times, a certain strategy may be used to select a uniform value, such as an intermediate value or an average value, to determine the focal length and the position information of the main point, to construct the target camera imaging matrix $K_t$, thereby converting the images acquired by the camera into the ones with same imaging model parameters.

After the camera model normalization is completed, these images performed with the parameter adjustment are input to step 2.

In addition, this step of a parameter normalization may be omitted for a camera with fixable camera imaging parameters.

Figure 2:
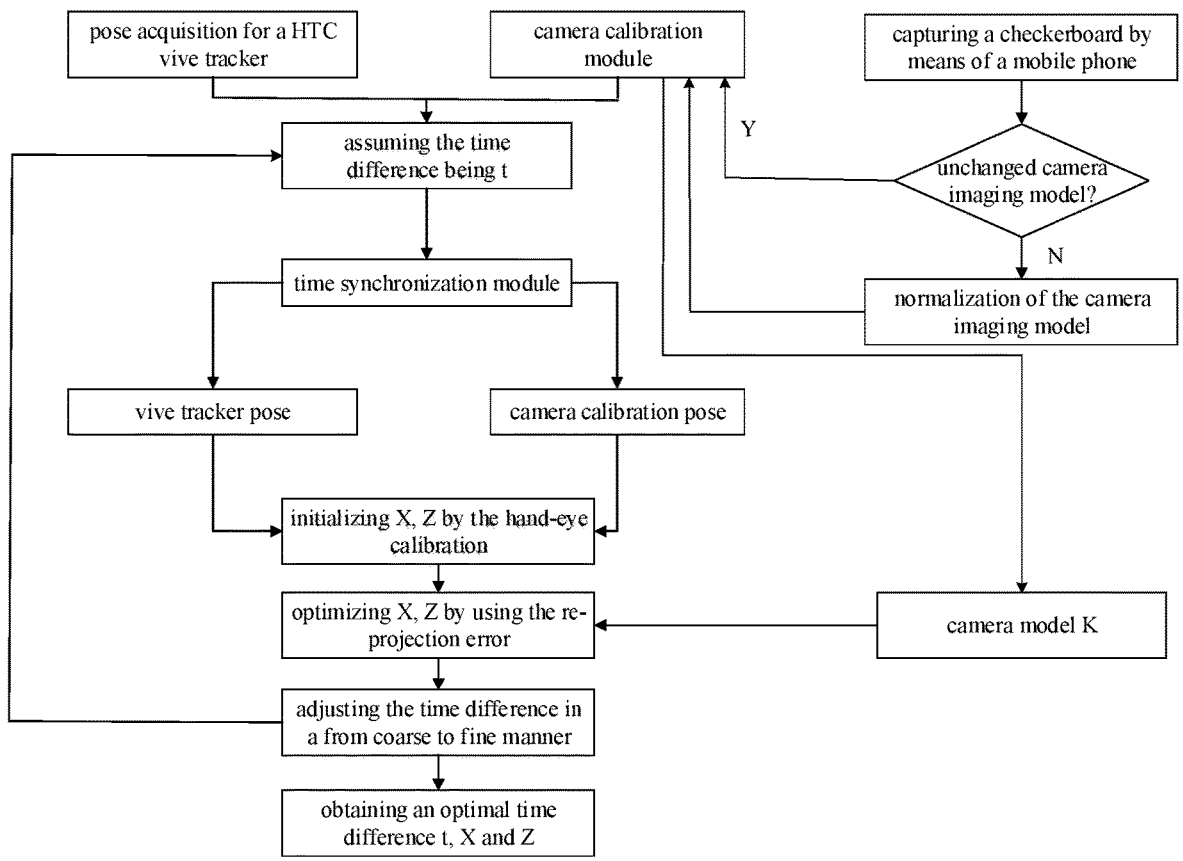
FIG. 2 is a flowchart of a monocular vision tracking method according to a preferred embodiment of the present application.

In step 2, by registration for the pose of the camera and that of the HTC vive tracker in terms of time and a space, it is here assumed that the camera imaging model is unchanged, the synchronization solution in terms of time and space for the camera and the HTC vive is detailed described in the following. FIG. 2 is a flowchart of a monocular vision tracking method according to a preferred embodiment provided by the present application. With reference to FIG. 2, the step 2 particularly includes:

1) Placing a HTC vive base and a checkerboard in the environment, and keeping the positions of both the base station and the checkerboard unchanged during the entire calibration process. Similarly, the HTC vive tracker and the camera are fixed together, and a relative position between them cannot be changed during data acquisition. Hereinafter, an acquisition and registration process will be described by using a rear camera of a mobile phone as the camera.

2) Constructing a pose acquisition system for the HTC vive tracker, wherein every data $(T_j, A_j)$ corresponds to one timestamp. $T_j$ indicates system time of the acquisition system when the j-th data is acquired by the HTC vive; $A_j$ indicates the position and the pose of the tracker output at this time. The position here is track information, which converts the camera coordinate into a world coordinate, namely a conversion of camera to world.

3) Constructing a camera data acquisition platform on a mobile side, wherein each frame corresponds to a time stamp during acquisition. Acquisition data on the mobile side is represented by $(t_i, I_i)$, wherein $t_i$ indicates system time at which the i-th frame image is acquired on the mobile side, and is the i-th frame image. The capturing object is a calibration board, which can be a checkerboard, or other forms of a calibration board.

4) Selecting a set of images for the captured checkerboard automatically or manually to calibrate camera parameters.

In one embodiment of a monocular vision tracking method according to the present application, the calculating a second camera pose according to the captured calibration board images further includes: selecting a set of images from the captured calibration board images according to image sharpness and camera pose difference; calculating a second camera pose in the camera calibration algorithm according to the selected set of images.

The automatic selection will be performed under the condition that the selected image sharpness and the camera pose (position and attitude) difference satisfy a certain threshold. Usually, an image with great difference is selected, wherein the camera pose difference may include a displacement, a rotation, a scale, or a distance toward the distortion in three directions between every two selected images.

Particularly, distances between a current image and the selected images are obtained firstly, so that a distance with the smallest value is determined. If the distance is greater than a threshold, the image is selected for camera calibration; otherwise, the next image is determined.

The distance between two images refers to a difference between two images. The distance between two images is defined as: the normalized offset of a center of gravity x of the angular points in the image, the normalized offset of a center of gravity y, a sum of the difference between the normalized area of the quadrilateral enclosed by the angular points and the deviation of the defined orientation angle.

The threshold is generally defined as between 0.2 and 0.4. In a case that a threshold is too high, the number of images selected will be small. In a case that a threshold is too low, the calibration images will be too dense and the similarity is too high, and the number of images will be too large, which increases the insignificant calculation.

5) Obtaining a camera pose $(t_k, B_k)$ corresponding to each frame of the set of images.

At this step, a phone is used to capture the checkerboard and the camera calibration algorithm is used to calculate the camera pose.

6) Fixing the time difference, performing the hand-eye calibration, and performing the optimization by means of the re-projection error.

The time difference between the time of the phone system and of the vive acquisition system is fixed. This is because the two systems acquire independently and are not accurately synchronized, so there exists a time difference. A registration is performed by means of the hand-eye calibration after obtaining the corresponding data. Taking the re-projection error as a criterion, the optimal correspondence (X, Z) in the case of the current time difference is obtained, and the optimal re-projection error corresponding to the timestamp is recorded.

A purpose of the hand-eye calibration is to obtain a conversion matrix between coordinate systems, including a conversion matrix X between the coordinate system of the pose of the camera and the coordinate system of the pose of the tracker, a conversion matrix Z between the coordinate system of the checkerboard and the base station.

The re-projection error refers to the difference between the projection (that is, a pixel on the image) and the re-projection (actually a virtual pixel obtained by means of the calculated value) of a real three-dimensional point on an image plane. Because of various reasons, the calculated value is not exactly matched with a value in an actual situation, that is, the difference cannot be exactly 0, thereby it is necessary to minimize the sum of these differences to obtain optimal camera parameters and coordinates of the three-dimensional space points.

FIG. 3 is a schematic diagram of a hand-eye calibration solution of a monocular vision tracking method provided by the present application. As shown in FIG. 3, both the HTC vive and the calibration board have their own coordinate systems respectively, which are now unified into a same coordinate system. In FIG. 3, A represents the pose of the HTC vive tracker in the HTC vive system, X represents the conversion matrix by means of which the coordinate system of the camera is converted into the coordinate system of the tracker, B represents the pose of the camera in the world coordinate system constructed by the calibration board, and Z represents a conversion matrix from the world coordinate system to the HTC vive coordinate system. The "world" shown in FIG. 3 represents the world coordinate system, that is, the coordinate system of the checkerboard or the calibration board. A, X, Z, and B are all 4*4 matrices. Therefore, as shown in FIG. 3, after the time registration, the pose of the vive tracker and of the camera are satisfied with the following relationship:

$$AX=ZB \quad (1)$$

7) Optimizing the re-projection error by repeating steps 5)-6) in a from coarse to fine manner. A time difference value corresponding to the smallest re-projection error is obtained.

Usually, the vive is connected to a computer. There is usually a time difference since the system time of the computer is different from the system time of the mobile phone, a time difference exists between data acquisition time of the vive and that of the mobile phone. Referring to FIG. 2, the specific steps of adjusting the time difference are in the following:

7a) Firstly, setting a larger time difference and a corresponding time interval for data selection. For example, the initial value of a time difference is set to ±5 s, the corresponding time interval is set to 0.5 s, and a time difference value is taken every interval of 0.5 s between ±5 s. The selected time difference values are ±5 s, ±4.5 s, ±4 s, . . . , 0. The re-projection error are optimized by repeating the steps 5)-6) based on these selected time difference values. The time difference value corresponding to the smallest re-projection error is obtained.

7b) Adjusting the time difference in a from coarse to fine manner. For example, in a case that the obtained time difference value corresponding to the smallest re-projection error in step 7 a) is 3 s, in the second cycle of the flow, the time difference and the corresponding time interval of the current cycle are reset according to the last result. For example, the time difference value can be set to 2.4 s-3.6 s and the time interval to 0.2 seconds, the time difference values selected in this cycle are then 2.4 s, 2.6 s, 2.8 s, . . . 3.6 s, and the re-projection error is optimized by repeating the steps 5)-6) according to these selected time difference values. The time difference value corresponding to the smallest re-projection error is obtained.

7c) Proceeding in this way, when the accuracy requirement is met, the loop is stopped and the time difference value corresponding to the smallest re-projection error is obtained.

As above seven steps, calibration for X, Z and the two acquisition time differences are performed by capturing the checkerboard by means of the mobile phone.

8) Obtaining a camera pose during image acquisition by capturing an actual usage scenario, for example, typical interactive scenarios for an AR user such as a desktop, ground and the like, and performing a corresponding conversion of the pose of the vive tracker in terms of time and space by the following formula:

$$B_j = Z^{-1} A_j X$$

So far, the construction of the monocular vision camera tracking database is completed.

FIG. 4 is flowchart of a monocular vision tracking method according to another preferred embodiment of the present application. With reference to FIG. 1-FIG. 4, in one embodiment of a monocular vision tracking method according to the present application, in step S130 of FIG. 1, the obtaining a conversion parameter between the first camera pose and the second camera pose specifically includes steps S210, S220 and S230. In step S210, acquiring corresponding data of the first camera pose and of the second camera pose according to a set time difference between system time of the camera and system time of the wireless tracker, and obtaining an optimal conversion matrix and an optimal re-projection error in the case of the time difference by using a hand-eye calibration for registration, wherein the optimal conversion matrix is a conversion matrix corresponding to the smallest re-projection error in the case of the time difference, and the optimal re-projection error corresponds to the optimal conversion matrix; in step S220, adjusting the time difference, and determining the time difference corresponding to the optimal re-projection error with the smallest value, as the system time difference; and in step S230, determining the optimal conversion matrix in the case of the system time difference, as the conversion parameter between the first camera pose and the second camera pose; wherein the conversion matrix includes a conversion matrix between a coordinate system of a pose of the camera and a coordinate system of a pose of the wireless tracker, a conversion matrix between a coordinate system of a calibration board and a coordinate system of a base station; the base station is configured to track a position of the wireless tracker; in step S140 in FIG. 1, the converting a first capturing pose into a second capturing pose by means of the conversion parameter when a scenario is captured includes: converting the first capturing pose into the second capturing pose by using the conversion parameter and the system time difference in a usage scenario.

Specifically, detailed steps of the obtaining a conversion parameter between the first camera pose and the second camera pose are as described in steps 6)-8) above in an usage scenario, in which the mobile phone is used as the camera and the HTC vive tracker is used as the wireless tracker.

The above step 6): fixing the time difference, performing the hand-eye calibration, and performing the optimization by means of the re-projection error may be further divided into the following steps:

6a) Obtaining data corresponding to the time from the data acquired by the vive and the camera.

For example, a camera capture frequency is 30 fps, and the frame rate of the vive to obtain data is 250 Hz. Therefore, it is necessary to extract data from the data acquired by the vive which has the same time as the camera, according to the assumed time difference. Since there is inevitably a time difference between the two, the interpolation algorithm can be selected to calculate the pose of the vive at that time.

With reference to FIG. 4 again, in one possible implementation, in step S210 of FIG. 4, the acquiring corresponding data of the first camera pose and of the second camera pose includes: extracting data, an acquisition time difference of which is less than a predetermined time difference threshold, from the data of the first camera pose in an interpolation algorithm according to the set time difference, wherein the acquisition time difference is the difference between acquisition time of the first camera pose and acquisition time of the second camera pose; using the extracted data of the first camera pose and data of the second camera pose corresponding to the extracted data of the first camera pose, as the corresponding data of the first camera pose and of the second camera pose respectively. The predetermined time difference threshold can be set according to an accuracy requirement.

6b) Converting the coordinate system of the pose of the camera and the coordinate system of the pose of the HTC into a unified coordinate system.

The coordinate system of the HTC vive is a left-hand coordinate system, and the coordinate system of the result of the camera calibration is a right-hand coordinate system. Here, the coordinate system of the vive is converted into a right-hand coordinate system. A correspondence between the left and right hand coordinate system conversion is as follows:

The correspondence of spatial positions is:

(x,y,z)→(−x,y,z)

The correspondence between the spatial pose quaternions is:

$(r_x, r_y, r_z, r_w) \rightarrow (-r_x, r_y, r_z, -r_w)$

6c) Obtaining initial values of X and Z.

From AX=ZB, it may be derived that $\Delta A X = X \Delta B$, wherein $\Delta A = A_i^{-1} A_{i+1}$, $\Delta B = B_i^{-1} B_{i+1}$, $i \in [0, n-1]$, n is the number of selected datum.

So, the initial value of X may be resolved based on SVD (Singular value decomposition).

The initial value of Z may be obtained from $A_0 X = Z B_0$.

6d) Optimizing the re-projection error.

The camera pose corresponding to the i-th frame image is $B_i^{-1}$, the positions of angular points on the checkerboard of the calibration board in the world coordinate system are denoted as $\{\vec{\chi}_k | k \in [0, N-1]\}$. N is the number of the angular points used on the checkerboard. Detected positions of the angular points on an image i are denoted as $\{\vec{x}_{ik} | \in [0, N-1]\}$, and the camera parameters are $K_i | i \in [0, n-1]$. The re-projection error formula is:

$$\min \sum_{i=0}^{n-1} \sum_{k=0}^{N-1} \left\| K_i B_i^{-1} \vec{\chi}_k - \vec{x}_{ik} \right\|$$

Because of $A_i X = Z B_i$, $B_i = Z^{-1} A_i X$, from this, the formula above is converted into:

$$\min_{X,Z,K} \sum_{i=0}^{n-1} \sum_{k=0}^{N-1} \left\| K_i X^{-1} A_i^{-1} Z \vec{\chi}_k - \vec{x}_{ik} \right\|.$$

In the above formula, it may be assumed that the camera model K corresponding to each frame of image is the same. Further, the K is firstly estimated by a camera calibration, and then X and Z are determined. Both X and Z are 6 degrees of freedom. Generally, an object has six degrees of freedom in space, that is, the degrees of freedom of movement in three orthogonal coordinate axes of x, y, and z, and the degrees of freedom of rotation about these three coordinate axes. The degrees of freedom may be obtained by the Gauss Newton method.

FIG. 5 is a flowchart of a monocular vision tracking method according to yet another preferred embodiment provided by the present application. With reference to FIG. 5, in one possible implementation, in step S210 in FIG. 4, the obtaining an optimal conversion matrix at a current time difference by taking the re-projection error as the determination criterion and using the hand-eye calibration for registration includes: in step S310, obtaining an initial value of the conversion matrix based on the singular value decomposition method according to the corresponding data of the first camera pose and of the second camera pose, and a formula of a conversion relationship between the first camera pose and the second camera pose, that is, the formula (1) above; in step S320, obtaining an optimal conversion matrix at a current time difference by optimizing the re-projection error using the Gauss-Newton method, according to the re-projection error formula and the formula of the conversion relationship between the first camera pose and the second camera pose.

Figure 6:
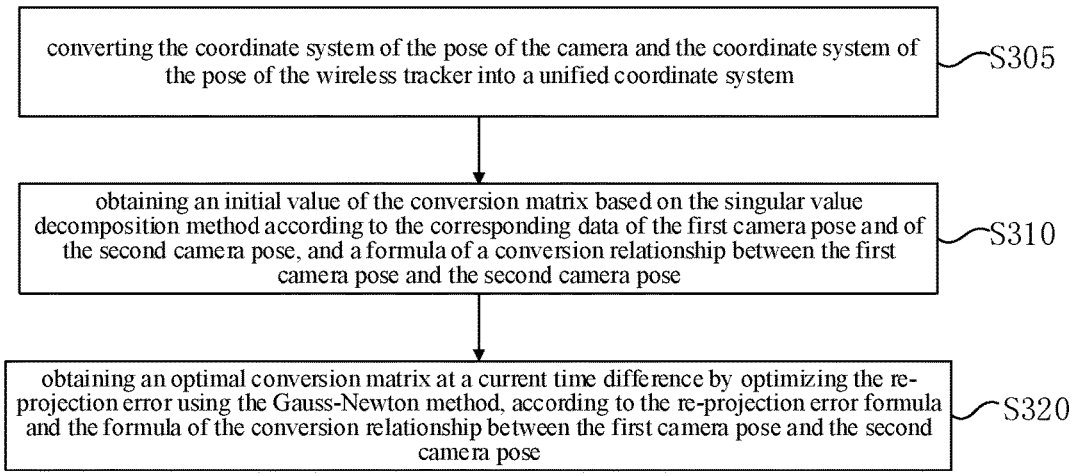
FIG. 6 is a flowchart of a monocular vision tracking method according to yet another preferred embodiment of the present application.

FIG. 6 is a flowchart of a monocular vision tracking method according to yet another preferred embodiment provided by the present application. With reference to FIG. 6, in one possible implementation, in step 310, before the obtaining an initial value of the conversion matrix based on the singular value decomposition method, the method further includes step S305 of converting the coordinate system of the pose of the camera and the coordinate system of the pose of the wireless tracker into a unified coordinate system. Specifically, the converting the coordinate system of the pose of the camera and the coordinate system of the pose of the wireless tracker into a unified coordinate system includes: converting the coordinate system of the pose of the wireless tracker into a right-hand coordinate system.

In the above technical solution, the re-projection error is used as a determination criterion, which has the following advantages or beneficial effects: the re-projection error is optimized by adjusting the time difference, and the time difference corresponding to the smallest re-projection error is determined as the system time difference between the system time of the camera and the system time of the wireless tracker, so that the constructed true value of the camera pose is more accurate, and the simulation effect of the user usage scenario is better.

Figure 7:
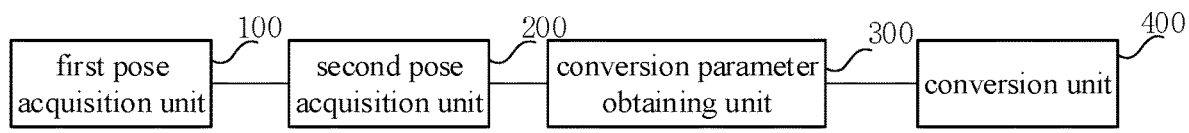
FIG. 7 is an overall frame diagram of a monocular vision tracking device according to an embodiment of the present application.

In another aspect, a monocular vision tracking device is provided in accordance with an embodiment of the present application. FIG. 7 is an overall frame diagram of a monocular vision tracking device according to an embodiment of the present application. As shown in FIG. 7, the monocular vision tracking device according the embodiment of the present application includes: a first pose acquisition unit 100 configured to acquire a first camera pose by using a wireless tracker; a second pose acquisition unit 200 configured to capture calibration board images by using a camera, and calculate a second camera pose according to the captured calibration board images; a conversion parameter obtaining unit 300 configured to obtain a conversion parameter between the first camera pose and the second camera pose; a conversion unit 400 configured to convert a first capture pose into a second capture pose by means of the conversion parameter when a scenario is captured, wherein the first capturing pose is acquired by the wireless tracker, and the second capturing pose corresponds to a pose of the camera; wherein a relative position between the wireless tracker and the camera remains unchanged, in processes of acquiring the first camera pose, capturing the calibration board images and capturing the scenario.

Figure 8:
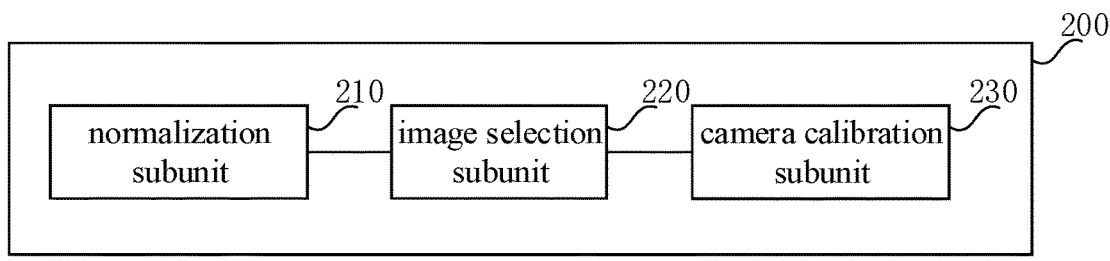
FIG. 8 is a structural block diagram of a monocular vision tracking device according to a preferred embodiment of the present application.

FIG. 8 is a structural block diagram of a monocular vision tracking device according to a preferred embodiment provided by the present application. As shown in FIG. 8, according to one implementation of the monocular vision tracking device of the present application, the second pose acquisition unit 200 includes a normalization subunit 210 configured to: perform a parameter normalization for the calibration board images captured by the camera, to convert the calibration board images based on different imaging model parameters into calibration board images with same imaging model parameters; and calculate the second camera pose in a camera calibration algorithm, based on the calibration board images performed with the parameter normalization.

According to one implementation of the monocular vision tracking device of the present application, the second pose acquisition unit 200 further includes: an image selection subunit 220 configured to select a set of images from the captured calibration board images according to image sharpness and camera pose difference; a camera calibration subunit 230 configured to calculate the second camera pose in the camera calibration algorithm according to the selected set of images.

Figure 9:
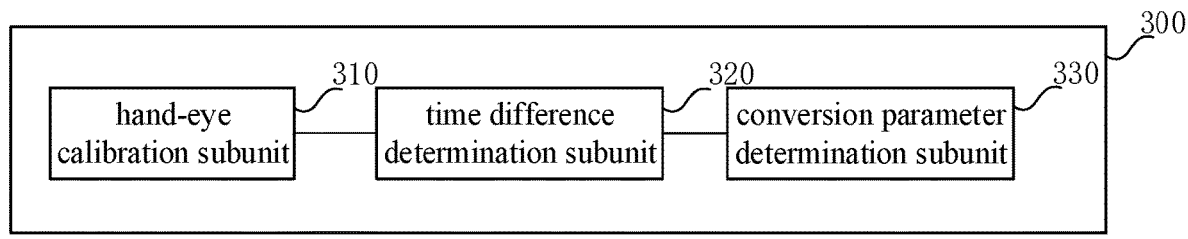
FIG. 9 is a structural block diagram of a monocular vision tracking device according to another preferred embodiment of the present application.

FIG. 9 is a structural block diagram of a monocular vision tracking device according to another preferred embodiment provided by the present application. As shown in FIG. 9, according to one implementation of the monocular vision tracking device of the present application, the conversion parameter obtaining unit 300 includes: a hand-eye calibration subunit 310 configured to acquire corresponding data of the first camera pose and of the second camera pose according to a set time difference between system time of the camera and system time of the wireless tracker, and obtain an optimal conversion matrix and an optimal re-projection error in the case of the time difference by using a hand-eye calibration for registration, wherein the optimal conversion matrix is a conversion matrix corresponding to the smallest re-projection error in the case of the time difference, and the optimal re-projection error corresponds to the optimal conversion matrix; a time difference determination subunit 320 configured to adjust the time difference, and determine the time difference corresponding to the optimal re-projection error with the smallest value, as the system time difference; and a conversion parameter determination subunit 330 configured to determine the optimal conversion matrix in the case of the system time difference, as the conversion parameter between the first camera pose and the second camera pose; wherein the conversion matrix includes a conversion matrix between a coordinate system of a pose of the camera and a coordinate system of a pose of the wireless tracker, a conversion matrix between a coordinate system of a calibration board and a coordinate system of a base station; the base station is configured to track a position of the wireless tracker; the conversion unit 400 is further configured to convert the first capturing pose into the second capturing pose by using the conversion parameter and the system time difference in a usage scenario.

Figure 10:
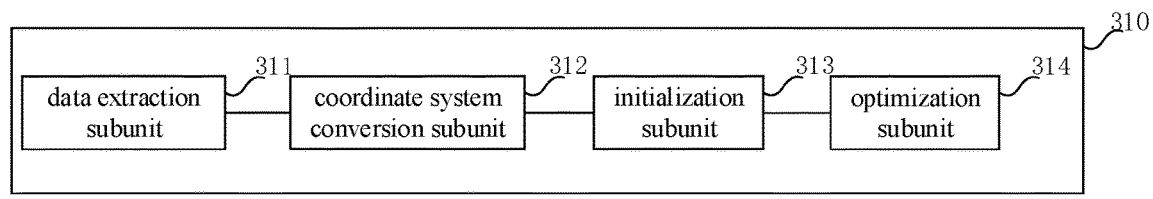
FIG. 10 is a structural block diagram of a monocular vision tracking device according to yet another preferred embodiment of the present application.

FIG. 10 is a structural block diagram of a monocular vision tracking device according to yet another preferred embodiment of the present application. As shown in FIG. 10, according to one implementation of the monocular vision tracking device of the present application, it is further included: the hand-eye calibration subunit 310 includes a data extraction subunit 311 configured to: extract data, an acquisition time difference of which is less than a predetermined time difference threshold, from the data of the first camera pose in an interpolation algorithm according to the set time difference, wherein the acquisition time difference is the difference between acquisition time of the first camera pose and acquisition time of the second camera pose; use the extracted data of the first camera pose and data of the second camera pose corresponding to the extracted data of the first camera pose, as the corresponding data of the first camera pose and of the second camera pose respectively.

According to one implementation of the monocular vision tracking device of the present application, the hand-eye calibration subunit 310 further includes: an initialization subunit 313 configured to obtain an initial value of the conversion matrix based on the singular value decomposition method according to the corresponding data of the first camera pose and of the second camera pose, and a formula of a conversion relationship between the first camera pose and the second camera pose; an optimization subunit 314 configured to obtain an optimal conversion matrix at a current time difference by optimizing the re-projection error using the Gauss-Newton method, according to a re-projection error formula and the formula of the conversion relationship between the first camera pose and the second camera pose; wherein the formula of the conversion relationship between the first camera pose and the second camera pose is AX=ZB, A represents the first camera pose, X represents the conversion matrix between the coordinate system of the pose of the camera and the coordinate system of the pose of the wireless tracker, B represents the second camera pose, and Z represents the conversion matrix between the coordinate system of the calibration board and the coordinate system of the base station; the re-projection error formula is:

$$\sum_{i=0}^{n-1} \sum_{k=0}^{N-1} \| K_i B_i^{-1} \vec{X}_k - \vec{x}_{ik} \|,$$

wherein $B_i^{-1}$ is the second camera pose corresponding to the i-th frame image, $K_i | i \in [0, n-1]$ is a camera internal parameter, and $\{\vec{\chi}_k | k \in [0, N-1]\}$ are positions of angular points on the calibration board in the coordinate system of the calibration board, $\{\vec{x}_{ik} | k \in [0, N-1]\}$ are detected position of angular points on an image i, N is the number of angular points on the calibration board.

According to one implementation of the monocular vision tracking device of the present application, the hand-eye calibration subunit 310 further includes a coordinate system conversion subunit 312 configured to convert the coordinate system of the pose of the camera and the coordinate system of the pose of the wireless tracker into a unified coordinate system before the obtaining an initial value of the conversion matrix based on the singular value decomposition method.

According to one implementation of the monocular vision tracking device of the present application, the coordinate system conversion subunit 312 is further configured to convert the coordinate system of the pose of the wireless tracker into a right-hand coordinate system.

Functions of each module in the device according to the embodiments of the present application refer to the corresponding description of the method mentioned above and thus detailed description thereof is omitted herein.

In another aspect, a monocular vision tracking apparatus is provided in accordance with an embodiment of the present application, including: one or more processors; and a storage device configured for storing one or more programs, wherein the one or more programs enable the one or more processors to implement any one of the monocular vision tracking methods described above.

In a possible design, the monocular vision tracking apparatus includes a processor and a memory, the memory is configured to store programs which support the monocular vision tracking apparatus in performing the monocular vision tracking methods described above, and the processor is configured to execute the programs stored in the memory. The monocular vision tracking apparatus can further includes communication interfaces configured for enabling the monocular vision tracking apparatus to communicate with another apparatus or communication network.

Figure 11:
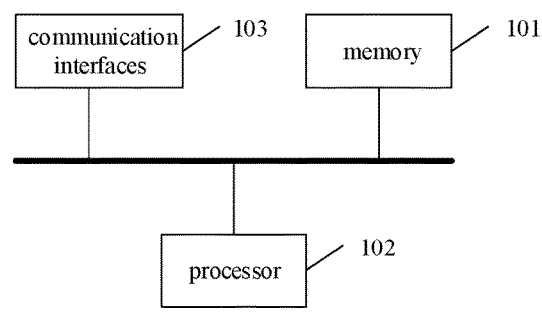
FIG. 11 is a structural block diagram of a monocular vision tracking apparatus according to an embodiment of the present application.

FIG. 11 is a structural block diagram of a monocular vision tracking apparatus according to an embodiment of the present application. As shown in FIG. 11, the apparatus includes a memory 101 and a processor 102. Computer programs that can run on the processor 102 are stored in the memory 101. When the processor 102 executes the computer programs, the monocular vision tracking method in the foregoing embodiment is implemented. The quantity of the memory 101 and the processor 102 may be one or more.

The monocular vision tracking apparatus further includes:

communication interfaces 103 configured to communicate with an external device to realize data interaction and transmission.

The memory 101 may include a high-speed RAM memory, or may also include a non-volatile memory, such as at least one magnetic disk memory.

If the memory 101, the processor 102, and the communication interfaces 103 are implemented independently, the memory 101, the processor 102, and the communication interfaces 103 may be connected and communicate with each other via a bus. The bus may be an Industry Standard Architecture (ISA) bus, a Peripheral Component (PCI) bus, an Extended Industry Standard Component (EISA) bus, or the like. The bus may be categorized into an address bus, a data bus, a control bus, and the like. For ease of illustration, only one bold line is shown in FIG. 11 to represent the bus, but it does not mean that there is only one bus or one type of bus.

Optionally, in a specific implementation, if the memory 101, the processor 102, and the communication interfaces 103 are integrated on one chip, then the memory 101, the processor 102, and the communication interfaces 103 can communication with each other via an internal interface.

In another aspect, a non-volatile computer-readable storage medium having computer programs stored therein is provided according to an embodiment of the present application, which implement any of the monocular vision tracking methods described above when executed by a processor.

In the description of the present specification, the description referring to the terms "an embodiment," "some embodiments," "an example," "a specific example," or "some examples" and the like are intended to mean that the specific characteristics, structures, materials, or features described in connection with the embodiment or example are included in at least one embodiment or example of the present application. Furthermore, the specific characteristics, structures, materials, or features described may be combined in any suitable manner in any one or more of the embodiments or examples. In addition, different embodiments or examples described in this specification and features of different embodiments or examples may be incorporated and combined by those skilled in the art, as long as they do no contradict with each other.

In addition, the terms "first" and "second" are used for descriptive purposes only and are not to be construed as indicating or implying relative importance or implicitly indicating the quantity of indicated technical features. Thus, features defined with "first" and "second" may explicitly or implicitly include at least one of the features. In the description of the present application, "a plurality of" means two or more than two, unless otherwise explicitly or specifically indicated.

Any process or method descriptions described in flowcharts or otherwise herein may be understood as representing modules, segments or portions of codes of executable instructions, which include one or more steps for implementing a particular logic function or process. In addition, the scope of the preferred embodiments of the present application includes additional implementations, where functions may not be performed in an order that is not shown or discussed, including in substantially concurrent manner or in a reverse order based on the functions involved. All these should be understood by those skilled in the art to which the embodiments of the present application belong.

The logic and/or steps, which are represented in the flowcharts or otherwise described herein, for example, may be considered as an ordered list of executable instructions for implementing logic functions. They can be specifically embodied in any non-volatile computer-readable medium for use by an instruction execution system, device, or apparatus (such as a computer-based system, a system including a processor, or another system that obtain instructions from an instruction execution system, device, or apparatus and execute the instructions) or for use in conjunction with the instruction execution system, device and apparatus. For the purposes of this specification, the "non-volatile computer-readable medium" can be any means that may contain, store, communicate with, propagate or transmit programs for use by an instruction execution system, device, or apparatus or for use in conjunction with these instruction execution system, device or apparatus. More specific examples (non-exhaustive list) of the non-volatile computer-readable media include the following: electrical connections (electronic devices) having one or more wires, portable computer disk cartridges (magnetic devices), random access memory (RAM), read only memory (ROM), erasable programmable read only memory (EPROM or flash memory), optical fiber devices, and portable read only memory (CDROM). In addition, the non-volatile computer-readable storage medium may even be paper or other suitable medium upon which the programs can be printed, as it may be read, for example, by optical scanning of the paper or other medium, followed by editing, interpretation or, if necessary, other suitable ways of processing so as to obtain the programs electronically, which are then stored in a computer memory.

It should be understood that individual portions of the present application may be implemented in the form of hardware, software, firmware, or a combination thereof. In the above embodiments, a plurality of steps or methods may be implemented by using software or firmware stored in a memory and executed by a suitable instruction execution system. For example, if they are implemented by hardware, as in another embodiment, the steps or methods may be implemented by using any one or a combination of the following techniques well known in the art: discrete logic circuits having logic gate circuits configured to implement logic functions for the data signals, application-specific integrated circuits having suitable combinational logic gate circuits, programmable gate arrays (PGA), field programmable gate arrays (FPGAs) and the like.

Those skilled in the art may understand that all or some of the steps carried in the methods in the foregoing embodiments may be implemented by using a program to instruct the relevant hardware. The program may be stored in a non-volatile computer-readable storage medium, and includes one or a combination of the steps of the method embodiments when executed.

In addition, individual functional units in various embodiments of the present disclosure may be integrated into one processing module, or individual units may also exist physically and independently, or two or more units may also be integrated in one module. The above integrated module can be implemented in the form of hardware or in the form of a software functional module. The integrated module may also be stored in a non-volatile computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto. Various changes or replacements readily contemplated by those skilled in the art within the technical scope of the present disclosure shall fall within the protection scope of the present disclosure. Therefore, the protection scope of the present disclosure should be subject to the protection scope of the claims.

What is claimed is:

1. A monocular vision tracking method, comprising:
   acquiring a first camera pose by using a wireless tracker;
   capturing calibration board images by using a camera, and selecting a set of images from the captured calibration board images according to image sharpness and camera pose difference;
   calculating a second camera pose in the camera calibration algorithm according to the selected set of images;
   obtaining a conversion parameter between the first camera pose and the second camera pose; and
   converting a first capturing pose into a second capturing pose by means of the conversion parameter when a scenario is captured, wherein the first capturing pose is acquired by the wireless tracker, and the second capturing pose corresponds to a pose of the camera,
   wherein a relative position between the wireless tracker and the camera remains unchanged, in processes of acquiring the first camera pose, capturing the calibration board images, and capturing the scenario.

2. The monocular vision tracking method according to claim 1, wherein the set of images are selected automatically or manually.

3. The monocular vision tracking method according to claim 2, wherein automatically selecting the set of images comprises:
   obtaining distances between a current image and selected images, to determine a distance with a smallest value among the distances;
   comparing the distance with the smallest value and a first threshold; and
   determining the current image as an image used for camera calibration, in response to determining that the distance with the smallest value is greater than the first threshold.

4. The monocular vision tracking method according to claim 3, wherein the first threshold is between 0.2 and 0.4.

5. The monocular vision tracking method according to claim 1, wherein the obtaining a conversion parameter between the first camera pose and the second camera pose comprises:
   acquiring corresponding data of the first camera pose and of the second camera pose according to a set time difference between system time of the camera and system time of the wireless tracker, and obtaining an optimal conversion matrix and an optimal re-projection error in the case of the time difference by using a hand-eye calibration for registration, wherein the optimal conversion matrix is a conversion matrix corresponding to the smallest re-projection error in the case of the time difference, and the optimal re-projection error corresponds to the optimal conversion matrix;
   adjusting the time difference, and determining the time difference corresponding to the optimal re-projection error with the smallest value, as a system time difference; and
   determining the optimal conversion matrix in the case of the system time difference, as the conversion parameter between the first camera pose and the second camera pose;
   wherein the conversion matrix comprises a conversion matrix between a coordinate system of a pose of the camera and a coordinate system of a pose of the wireless tracker, a conversion matrix between a coordinate system of a calibration board and a coordinate system of a base station; the base station is configured to track a position of the wireless tracker;
   the converting a first capturing pose into a second capturing pose by means of the conversion parameter when a scenario is captured comprises:
   converting the first capturing pose into the second capturing pose by using the conversion parameter and the system time difference in a usage scenario.

6. The monocular vision tracking method according to claim 5, wherein the acquiring corresponding data of the first camera pose and the second camera pose comprises:
   extracting data, an acquisition time difference of which is less than a predetermined time difference threshold, from the data of the first camera pose in an interpolation algorithm according to the set time difference, wherein the acquisition time difference is the difference between acquisition time of the first camera pose and acquisition time of the second camera pose;
   using the extracted data of the first camera pose and data of the second camera pose corresponding to the extracted data of the first camera pose, as the corresponding data of the first camera pose and of the second camera pose respectively.

7. The monocular vision tracking method according to claim 5, wherein the obtaining an optimal conversion matrix in the case of the time difference by using a hand-eye calibration for registration comprises:
   obtaining an initial value of the conversion matrix based on the singular value decomposition method according to the corresponding data of the first camera pose and of the second camera pose, and a formula of a conversion relationship between the first camera pose and the second camera pose;

obtaining an optimal conversion matrix at a current time difference by optimizing the re-projection error using the Gauss-Newton method, according to a re-projection error formula and the formula of the conversion relationship between the first camera pose and the second camera pose;

wherein the formula of the conversion relationship between the first camera pose and the second camera pose is AX=ZB, A represents the first camera pose, X represents the conversion matrix between the coordinate system of the pose of the camera and the coordinate system of the pose of the wireless tracker, B represents the second camera pose, and Z represents the conversion matrix between the coordinate system of the calibration board and the coordinate system of the base station;

the re-projection error formula is:

$$\min \sum_{i=0}^{n-1} \sum_{k=0}^{N-1} \left\| K_i B_i^{-1} \vec{X}_k - \vec{x}_{ik} \right\|,$$

wherein $B_i^{-1}$ is the second camera pose corresponding to the i-th frame image, $K_i | i \in [0, n-1]$ is a camera internal parameter, and $\{\vec{\chi}_k | k \in [0, N-1]\}$ are positions of angular points on the calibration board in the coordinate system of the calibration board, $\{\vec{x}_{ik} | k \in [0, N-1]\}$ are detected positions of angular points on an image i, N is the number of angular points on the calibration board.

8. The monocular vision tracking method according to claim 7, wherein before the obtaining an initial value of the conversion matrix based on the singular value decomposition method, further comprises:
converting the coordinate system of the pose of the camera and the coordinate system of the pose of the wireless tracker into a unified coordinate system.

9. The monocular vision tracking method according to claim 8, wherein the converting the coordinate system of the pose of the camera and the coordinate system of the pose of the wireless tracker into a unified coordinate system comprises:
converting the coordinate system of the pose of the wireless tracker into a right-hand coordinate system.

10. A monocular vision tracking device, comprising:
one or more processors; and
a memory configured for storing one or more programs, wherein
the one or more programs are executed by the one or more processors to enable the one or more processors to:
acquire a first camera pose by using a wireless tracker;
capture calibration board images by using a camera, and select a set of images from the captured calibration board images according to image sharpness and camera pose difference;
calculate a second camera pose in the camera calibration algorithm according to the selected set of images;
obtain a conversion parameter between the first camera pose and the second camera pose; and
convert a first capturing pose into a second capturing pose by means of the conversion parameter when a scenario is captured, wherein the first capturing pose is acquired by the wireless tracker, and the second capturing pose corresponds to a pose of the camera,
wherein a relative position between the wireless tracker and the camera remains unchanged, in processes of acquiring the first camera pose, capturing the calibration board images, and capturing the scenario.

11. The monocular vision tracking device according to claim 10, wherein the set of images are selected automatically or manually.

12. The monocular vision tracking device according to claim 11, wherein in case that the set of images are selected automatically, the one or more programs are executed by the one or more processors to further enable the one or more processors to:
obtain distances between a current image and selected images, to determine a distance with a smallest value among the distances;
compare the distance with the smallest value and a first threshold; and
determine the current image as an image used for camera calibration, in response to determining that the distance with the smallest value is greater than the first threshold.

13. The monocular vision tracking device according to claim 12, wherein the first threshold is between 0.2 and 0.4.

14. The monocular vision tracking device according to claim 10, wherein the one or more programs are executed by the one or more processors to further enable the one or more processors to:
acquire corresponding data of the first camera pose and of the second camera pose according to a set time difference between system time of the camera and system time of the wireless tracker, and obtain an optimal conversion matrix and an optimal re-projection error in the case of the time difference by using a hand-eye calibration for registration, wherein the optimal conversion matrix is a conversion matrix corresponding to the smallest re-projection error in the case of the time difference, and the optimal re-projection error corresponds to the optimal conversion matrix;
adjust the time difference, and determine the time difference corresponding to the optimal re-projection error with the smallest value, as a system time difference; and
determine the optimal conversion matrix in the case of the system time difference, as the conversion parameter between the first camera pose and the second camera pose,
wherein the conversion matrix comprises a conversion matrix between a coordinate system of a pose of the camera and a coordinate system of a pose of the wireless tracker, a conversion matrix between a coordinate system of a calibration board and a coordinate system of a base station; the base station is configured to track a position of the wireless tracker;
the one or more programs are executed by the one or more processors to enable the one or more processors further to:
convert the first capturing pose into the second capturing pose by using the conversion parameter and the system time difference in a usage scenario.

15. The monocular vision tracking device according to claim 14, wherein the one or more programs are executed by the one or more processors to enable the one or more processors further to:
extract data, an acquisition time difference of which is less than a predetermined time difference threshold, from the data of the first camera pose in an interpolation algorithm according to the set time difference, wherein the acquisition time difference is the difference between acquisition time of the first camera pose and acquisition time of the second camera pose; and use the extracted data of the first camera pose and data of the second camera pose corresponding to the extracted data of the first camera pose, as the corresponding data of the first camera pose and of the second camera pose respectively.

16. The monocular vision tracking device according to claim 14, wherein the one or more programs are executed by the one or more processors to enable the one or more processors further to:

obtain an initial value of the conversion matrix based on the singular value decomposition method according to the corresponding data of the first camera pose and of the second camera pose, and a formula of a conversion relationship between the first camera pose and the second camera pose;

obtain an optimal conversion matrix at a current time difference by optimizing the re-projection error using the Gauss-Newton method, according to a re-projection error formula and the formula of the conversion relationship between the first camera pose and the second camera pose, wherein the formula of the conversion relationship between the first camera pose and the second camera pose is AX=ZB, A represents the first camera pose, X represents the conversion matrix between the coordinate system of the pose of the camera and the coordinate system of the pose of the wireless tracker, B represents the second camera pose, and Z represents the conversion matrix between the coordinate system of the calibration board and the coordinate system of the base station;

the re-projection error formula is:

$$\min \sum_{i=0}^{n-1} \sum_{k=0}^{N-1} \left\| K_i B_i^{-1} \vec{X}_k - \vec{x}_{ik} \right\|,$$

wherein $B_i^{-1}$ is the second camera pose corresponding to the i-th frame image, $K_i | i \in [0,n-1]$ is a camera internal parameter, and $\{\vec{\chi}_k | k \in [0,N-1]\}$ are positions of angular points on the calibration board in the coordinate system of the calibration board, $\{\vec{x}_{ik} | k \in [0,N-1]\}$ are detected positions of angular points on an image i, N is the number of angular points on the calibration board.

17. The monocular vision tracking device according to claim 16, wherein the one or more programs are executed by the one or more processors to enable the one or more processors further to:

convert the coordinate system of the pose of the camera and the coordinate system of the pose of the wireless tracker into a unified coordinate system, before the initial value of the conversion matrix is obtained based on the singular value decomposition method.

18. The monocular vision tracking device according to claim 17, wherein the one or more programs are executed by the one or more processors to enable the one or more processors further to convert the coordinate system of the pose of the wireless tracker into a right-hand coordinate system.

19. A non-transitory computer-readable storage medium, in which computer programs are stored, wherein the computer programs, when executed by a processor, enable the processor to:

acquire a first camera pose by using a wireless tracker;

capture calibration board images by using a camera, and select a set of images from the captured calibration board images according to image sharpness and camera pose difference;

calculate a second camera pose in the camera calibration algorithm according to the selected set of images;

obtain a conversion parameter between the first camera pose and the second camera pose; and convert a first capturing pose into a second capturing pose by means of the conversion parameter when a scenario is captured, wherein the first capturing pose is acquired by the wireless tracker, and the second capturing pose corresponds to a pose of the camera, wherein a relative position between the wireless tracker and the camera remains unchanged, in processes of acquiring the first camera pose, capturing the calibration board images, and capturing the scenario.

20. The non-transitory computer-readable storage medium according to claim 19, wherein the set of images are selected automatically or manually.

* * * * *